United States Patent
Lewis et al.

(10) Patent No.: US 7,240,663 B2
(45) Date of Patent: Jul. 10, 2007

(54) INTERNAL COMBUSTION ENGINE SHUT-DOWN FOR ENGINE HAVING ADJUSTABLE VALVES

(75) Inventors: Donald J. Lewis, Howell, MI (US); Dennis Reed, Dexter, MI (US); Nate Trask, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/149,942

(22) Filed: Jun. 10, 2005

(65) Prior Publication Data

US 2005/0279323 A1    Dec. 22, 2005

Related U.S. Application Data

(63) Continuation-in-part of application No. 11/079,968, filed on Mar. 14, 2005, which is a continuation-in-part of application No. 10/805,648, filed on Mar. 19, 2004, now Pat. No. 7,021,289.

(51) Int. Cl.
 *F02D 13/04* (2006.01)
 *F02N 17/00* (2006.01)
 *F01L 9/04* (2006.01)

(52) U.S. Cl. ............ 123/321; 123/179.4; 123/90.11; 123/198 D

(58) Field of Classification Search ............ 701/112, 701/114, 101; 123/321, 179.4, 198 D, 198 DB, 123/198 DC, 568.11; 180/65.1, 65.5
See application file for complete search history.

(56) References Cited

U.S. PATENT DOCUMENTS

| 3,828,247 A | 8/1974 | Kirsch et al. |
| 3,865,088 A | 2/1975 | Links |
| 4,009,695 A | 3/1977 | Ule |
| 4,129,040 A * | 12/1978 | Hayden, Jr. .................. 73/507 |
| 4,732,117 A | 3/1988 | Tanahashi et al. |
| 4,779,528 A | 10/1988 | Bruke |
| 4,794,891 A | 1/1989 | Knobloch |

(Continued)

FOREIGN PATENT DOCUMENTS

EP    1054148    4/2002

(Continued)

OTHER PUBLICATIONS

Manfred Klüting, et al., "Throttle-free load control with fully variable valve drives," trans. from MTZ—Autmotive Engine Magazine, 60 (Aug. 1999), Germany.

(Continued)

*Primary Examiner*—Stephen K. Cronin
*Assistant Examiner*—Johnny H. Hoang
(74) *Attorney, Agent, or Firm*—Allan J. Lippa; Alleman Hall McCoy Russell & Tuttle LLP

(57) ABSTRACT

A method for operating an engine in a vehicle, the engine having at least a cylinder, is described. The method comprises decreasing rotational speed of the engine; and when said engine speed falls in a specified region, adjusting a valve timing of the cylinder to generate one of expansion or compression braking torque to stop rotation of said engine in a desired range.

21 Claims, 12 Drawing Sheets

U.S. PATENT DOCUMENTS

| | | |
|---|---|---|
| 4,807,495 A | 2/1989 | Wallace |
| 4,848,284 A | 7/1989 | Konno |
| 4,926,823 A | 5/1990 | Kishi et al. |
| 4,965,741 A | 10/1990 | Winchell et al. |
| 4,976,228 A | 12/1990 | Kawamura |
| 4,990,854 A | 2/1991 | Friz |
| 5,016,494 A | 5/1991 | Yamaguchi |
| 5,072,700 A | 12/1991 | Kawamura |
| 5,072,702 A * | 12/1991 | Sasaki et al. ............ 123/179.4 |
| 5,117,790 A | 6/1992 | Clarke et al. |
| 5,123,397 A | 6/1992 | Richeson |
| 5,129,369 A | 7/1992 | Kawamura |
| 5,190,013 A | 3/1993 | Dozier |
| 5,201,296 A | 4/1993 | Wunning et al. |
| 5,216,987 A | 6/1993 | Clarke |
| 5,236,332 A | 8/1993 | Satou et al. |
| 5,280,770 A | 1/1994 | Satou et al. |
| 5,284,116 A | 2/1994 | Richeson, Jr. |
| 5,357,916 A | 10/1994 | Matterazzo |
| 5,408,958 A | 4/1995 | Esch et al. |
| 5,422,811 A | 6/1995 | Togai |
| 5,442,515 A | 8/1995 | Wallaert |
| 5,515,828 A | 5/1996 | Cook et al. |
| 5,548,514 A | 8/1996 | Hasegawa et al. |
| 5,596,956 A | 1/1997 | Ogawa et al. |
| 5,600,056 A | 2/1997 | Hasegawa et al. |
| 5,617,829 A | 4/1997 | Bidner et al. |
| 5,636,601 A | 6/1997 | Moriya et al. |
| 5,647,312 A | 7/1997 | Salber et al. |
| 5,669,341 A | 9/1997 | Ushirono et al. |
| 5,673,676 A | 10/1997 | Mukumoto |
| 5,678,402 A | 10/1997 | Kitagawa et al. |
| 5,743,221 A | 4/1998 | Schmitz |
| 5,746,183 A | 5/1998 | Parke et al. |
| 5,765,514 A | 6/1998 | Sono et al. |
| 5,803,040 A | 9/1998 | Biesinger et al. |
| 5,921,216 A * | 7/1999 | Ballman et al. ............ 123/321 |
| 5,930,992 A | 8/1999 | Esch et al. |
| 5,934,231 A | 8/1999 | Schmitz et al. |
| 5,947,095 A | 9/1999 | Kato |
| 5,950,603 A | 9/1999 | Cook et al. |
| 5,957,095 A | 9/1999 | Kako |
| 5,992,153 A | 11/1999 | Tsuchihashi et al. |
| 6,000,376 A | 12/1999 | Hess et al. |
| 6,023,939 A | 2/2000 | Correa |
| 6,039,026 A | 3/2000 | Shiraishi et al. |
| 6,050,231 A | 4/2000 | Tisch et al. |
| 6,062,186 A | 5/2000 | Barnes et al. |
| 6,085,717 A | 7/2000 | Kamura et al. |
| 6,098,585 A | 8/2000 | Brehob et al. |
| 6,109,225 A | 8/2000 | Ogita et al. |
| 6,116,210 A | 9/2000 | Oder et al. |
| 6,138,636 A | 10/2000 | Kohno et al. |
| 6,178,934 B1 | 1/2001 | Hirasawa et al. |
| 6,192,857 B1 | 2/2001 | Shimada |
| 6,202,608 B1 | 3/2001 | Yamaki et al. |
| 6,216,652 B1 | 4/2001 | Gramann et al. |
| 6,217,480 B1 | 4/2001 | Iwata et al. |
| 6,219,611 B1 | 4/2001 | Russell |
| 6,220,223 B1 | 4/2001 | Weisman, II et al. |
| 6,247,445 B1 | 6/2001 | Langer |
| 6,247,449 B1 | 6/2001 | Persson |
| 6,250,266 B1 | 6/2001 | Okui et al. |
| 6,260,525 B1 | 7/2001 | Moyer |
| 6,269,632 B1 | 8/2001 | Schmitz |
| 6,276,316 B1 | 8/2001 | Arai et al. |
| 6,311,667 B1 | 11/2001 | Satou et al. |
| 6,321,700 B1 | 11/2001 | Hein et al. |
| 6,330,870 B1 | 12/2001 | Inoue et al. |
| 6,332,445 B1 | 12/2001 | Voss et al. |
| 6,332,446 B1 | 12/2001 | Matsumoto et al. |
| 6,333,843 B2 | 12/2001 | Boie et al. |
| 6,336,355 B1 | 1/2002 | Sasaki et al. |
| 6,336,436 B1 | 1/2002 | Miyakubo et al. |
| 6,341,487 B1 | 1/2002 | Takahashi et al. |
| 6,341,584 B1 | 1/2002 | Itoyama et al. |
| 6,349,541 B1 | 2/2002 | Gruden et al. |
| 6,363,907 B1 | 4/2002 | Arai et al. |
| 6,367,437 B2 | 4/2002 | Nakamura et al. |
| 6,374,783 B1 | 4/2002 | Toriumi |
| 6,374,813 B1 | 4/2002 | Iida et al. |
| 6,382,193 B1 | 5/2002 | Boyer et al. |
| 6,386,156 B1 | 5/2002 | Stockhausen et al. |
| 6,389,806 B1 | 5/2002 | Glugla et al. |
| 6,390,038 B1 | 5/2002 | Di Lieto et al. |
| 6,390,063 B1 | 5/2002 | Obata et al. |
| 6,397,813 B1 | 6/2002 | Han et al. |
| 6,401,026 B2 | 6/2002 | Robichaux et al. |
| 6,401,684 B2 | 6/2002 | Hori et al. |
| 6,408,625 B1 | 6/2002 | Woon et al. |
| 6,408,806 B2 | 6/2002 | Sugiyama et al. |
| 6,415,601 B1 | 7/2002 | Glugla et al. |
| 6,422,185 B1 | 7/2002 | Duesmann et al. |
| 6,425,369 B2 | 7/2002 | Arai et al. |
| 6,431,129 B1 | 8/2002 | Hammoud et al. |
| 6,431,130 B1 | 8/2002 | Leone et al. |
| 6,435,147 B1 | 8/2002 | Eichenseher et al. |
| 6,443,108 B1 | 9/2002 | Brehob et al. |
| 6,446,588 B2 | 9/2002 | Yamada et al. |
| 6,453,662 B1 | 9/2002 | Lewis et al. |
| 6,453,665 B1 | 9/2002 | Bower, Jr. et al. |
| 6,457,465 B2 | 10/2002 | Lee |
| 6,460,500 B1 | 10/2002 | Ooyama et al. |
| 6,470,853 B1 | 10/2002 | Leone et al. |
| 6,474,303 B1 | 11/2002 | Leone et al. |
| 6,481,201 B2 | 11/2002 | Kako et al. |
| 6,484,677 B2 | 11/2002 | Leone et al. |
| 6,497,093 B1 | 12/2002 | Lewis et al. |
| 6,502,389 B2 | 1/2003 | Katayama et al. |
| 6,505,113 B2 | 1/2003 | Eichenseher et al. |
| 6,510,824 B2 | 1/2003 | Vorih et al. |
| 6,513,319 B2 | 2/2003 | Nozawa et al. |
| 6,513,493 B1 | 2/2003 | Robichaux et al. |
| 6,519,933 B2 | 2/2003 | Ogiso et al. |
| 6,523,504 B2 | 2/2003 | Miura |
| 6,526,745 B1 | 3/2003 | Ogiso et al. |
| 6,532,944 B1 | 3/2003 | Leone et al. |
| 6,546,910 B2 | 4/2003 | Tanaka et al. |
| 6,550,240 B2 | 4/2003 | Kolmanovsky et al. |
| 6,550,434 B2 | 4/2003 | Leone et al. |
| 6,553,961 B2 | 4/2003 | Hammoud et al. |
| 6,557,505 B1 | 5/2003 | Hori |
| 6,568,177 B1 | 5/2003 | Surnilla et al. |
| 6,591,605 B2 | 7/2003 | Lewis |
| 6,594,987 B2 | 7/2003 | Uranishi |
| 6,595,183 B1 | 7/2003 | Olofsson |
| 6,619,245 B1 | 9/2003 | Fujiwara et al. |
| 6,619,262 B2 | 9/2003 | Graf et al. |
| 6,620,076 B1 | 9/2003 | Kawamura |
| 6,629,409 B2 | 10/2003 | Lewis et al. |
| 6,637,386 B2 | 10/2003 | Murata et al. |
| 6,640,756 B2 | 11/2003 | Ogiso |
| 6,644,265 B2 | 11/2003 | Parker et al. |
| 6,649,747 B1 | 11/2003 | Lohse |
| 6,655,353 B1 | 12/2003 | Rayl |
| 6,681,173 B2 | 1/2004 | Turner et al. |
| 6,691,021 B2 | 2/2004 | Takagi et al. |
| 6,701,887 B2 | 3/2004 | Salber et al. |
| 6,718,928 B2 | 4/2004 | Brueggen et al. |
| 6,718,937 B2 | 4/2004 | Kim |
| 6,735,938 B2 | 5/2004 | Surnilla |
| 6,736,121 B2 | 5/2004 | Gopichandra |
| 6,761,147 B2 | 7/2004 | Majima |
| 6,763,707 B2 | 7/2004 | Kumagai et al. |

| | | |
|---|---|---|
| 6,766,641 B1 | 7/2004 | Surnilla et al. |
| 6,772,723 B2 | 8/2004 | Aoki et al. |
| 6,785,603 B2 | 8/2004 | Inoue |
| 6,799,421 B2 | 10/2004 | Surnilla |
| 6,832,977 B2 | 12/2004 | You |
| 6,837,040 B2 | 1/2005 | Sonoda et al. |
| 6,866,012 B2 | 3/2005 | Hayase et al. |
| 6,883,319 B2 | 4/2005 | Ekenberg |
| 6,898,927 B2 | 5/2005 | Morinaga et al. |
| 6,907,725 B2 | 6/2005 | Szymkowicz et al. |
| 6,912,995 B2 | 7/2005 | Miura |
| 6,935,295 B2 | 8/2005 | Marriott |
| 6,938,598 B1 | 9/2005 | Lewis et al. |
| 6,955,144 B2 | 10/2005 | Sakai et al. |
| 6,975,935 B2 * | 12/2005 | Kohler et al. ............... 701/114 |
| 7,027,911 B2 * | 4/2006 | Nishikawa et al. ......... 701/112 |
| 2001/0003971 A1 | 6/2001 | Hori et al. |
| 2001/0023667 A1 | 9/2001 | Miura |
| 2001/0050065 A1 | 12/2001 | Yamada et al. |
| 2002/0038541 A1 | 4/2002 | Surnilla et al. |
| 2002/0096139 A1 | 7/2002 | Zheng |
| 2002/0157630 A1 | 10/2002 | Gerhard et al. |
| 2003/0015026 A1 | 1/2003 | Chung |
| 2003/0051465 A1 | 3/2003 | Kolmanovsky et al. |
| 2003/0070423 A1 | 4/2003 | Morinaga et al. |
| 2003/0073540 A1 | 4/2003 | Eguchi et al. |
| 2003/0106515 A1 | 6/2003 | Kondo |
| 2003/0131820 A1 | 7/2003 | Mckay et al. |
| 2004/0083719 A1 | 5/2004 | Xu et al. |
| 2004/0103867 A1 | 6/2004 | Hayase et al. |
| 2004/0206068 A1 | 10/2004 | Michelini |
| 2005/0028515 A1 | 2/2005 | Fukuma et al. |
| 2005/0166900 A1 | 8/2005 | Song et al. |
| 2005/0199220 A1 | 9/2005 | Ogiso |
| 2005/0205049 A1 | 9/2005 | Lewis |

FOREIGN PATENT DOCUMENTS

| | | |
|---|---|---|
| JP | 55-29002 | 3/1980 |
| JP | 55-49549 | 4/1980 |

OTHER PUBLICATIONS

Lucien Koopmans, et al., "A Four Stroke Camless Engine, Operated in Homogeneous Charge Compression Ignition Mode with Commercial Gasoline," SAE Technical Paper Series, Sep. 24-27, 2001, pp. 1-14, No. 2001-01-3610, SAE International, Warrendale, Pennsylvania, USA.

Van Nieuwstadt, et al., "Air Charge Estimation in Camless Engines," SAE Technical Paper Series, 2001, 2001-01-0581.

Pierik, et al., "Design and Development of a Mechanical Variable Valve Actuation System," SAE Technical Paper Series, Mar. 6-9, 2000, pp. 1-8, No. 2000-01-1221, SAE International, Warrendale, Pennsylvania, USA.

Pischinger, et al., "Benefits of the Electromechanical Valve Train in Vehicle Operation," SAE Technical Paper Series, Mar. 6-9, 2000, No. 2000-01-1223, SAE International, Warrendale, Pennsylvania, USA.

Salber, et al., "Synergies of Variable Valve Actuation and Direct Injection," SAE Technical Paper Series, Mar. 4-7, 2002, No. 2002-01-0706, SAE International, Warrendale, Pennsylvania, USA.

"Operation of the Electronic Valve Actuation," Ford EVA Project Closed Loop Engine, System Control, Manual—Preliminary Version III, Mar. 21, 2003, in particular reference to pp. 6, 72, 80-84, 89-95, 104-119, and 134-218.

* cited by examiner

INTERNAL COMBUSTION ENGINE SHUT-DOWN FOR ENGINE HAVING ADJUSTABLE VALVES

CROSS REFERENCE TO RELATED APPLICATIONS

The present application is a continuation-in-part of U.S. Ser. No. 11/079,968, titled ENGINE SHUT-DOWN FOR ENGINE HAVING ADJUSTABLE VALVE TIMING, filed Mar. 14, 2005 (which is a continuation-in-part of U.S. Ser. No. 10/805,648), the entire contents of which are incorporated herein by reference in their entirety for all purposes. The present application is also a continuation-in-part of U.S. Ser. No. 10/805,648, titled REDUCING ENGINE EMISSIONS ON AN ENGINE WITH ELECTROMECHANICAL VALVES, filed Mar. 19, 2004, now U.S Pat. No. 7,021,289 the entire contents of which are incorporated herein by reference in their entirety for all purposes

FIELD

The present description relates to a method for improving a shut-down of an internal combustion engine and a subsequent re-start.

BACKGROUND AND SUMMARY

Engine rotation can be stopped in a variety of ways to achieve a variety of results. In one example, an electric motor coupled to the engine can be used to control stopping position along with compression energy stored in the compressed gas in the cylinder. Specifically, electric motor control either before or after the engine stops can be used, or mechanically re-designing the engine may be used.

However, the inventors herein have recognized some issues with such an approach. For example, some vehicles may not be equipped with a motor or electrical storage system than can reliably perform the desired torque control before the engine stops. Further, as operating conditions vary, the amount of compression force available can vary, thus affecting the stop position greatly.

Thus, in one approach, a method for operating at least an intake and exhaust valve in a cylinder with a piston of an engine in a vehicle is provided. The method comprises: during conditions of an engine shut-down, monitoring engine rotation; and when engine speed falls below a threshold value, adjusting one of an intake or exhaust valve opening or closing to repeatably stop the engine with a selected piston in a selected location.

In this way, it is possible to obtain repeatable engine stopping control without requiring additional motor operation (although such operation may be used, if desired). Further, valve adjustments can be made to reduce oxygen flowing to the exhaust to improve catalyst operation on subsequent restarts.

DETAILED DESCRIPTION

Figure 1:
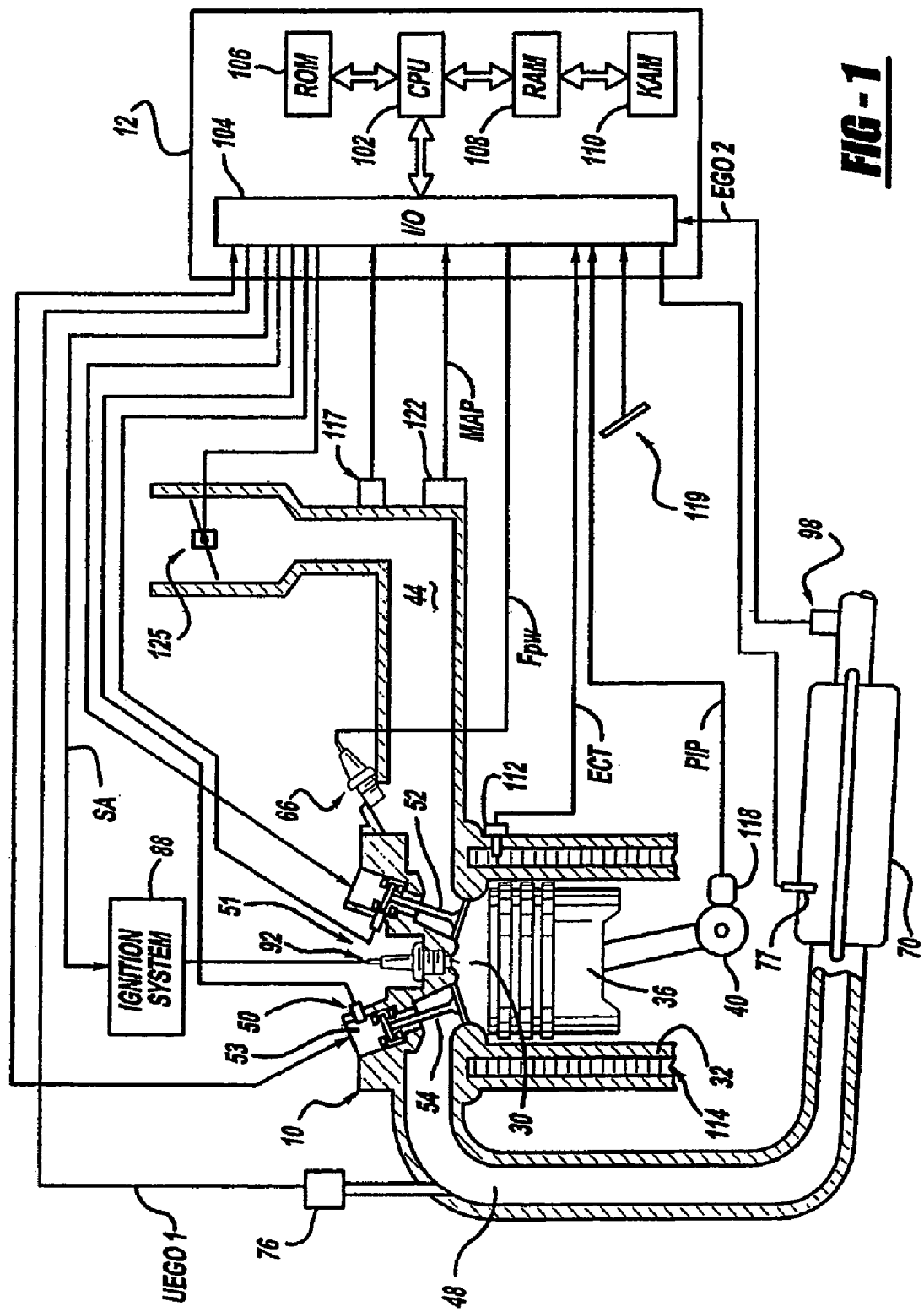
FIG. 1 is a schematic diagram of an engine.
Figure 1A:
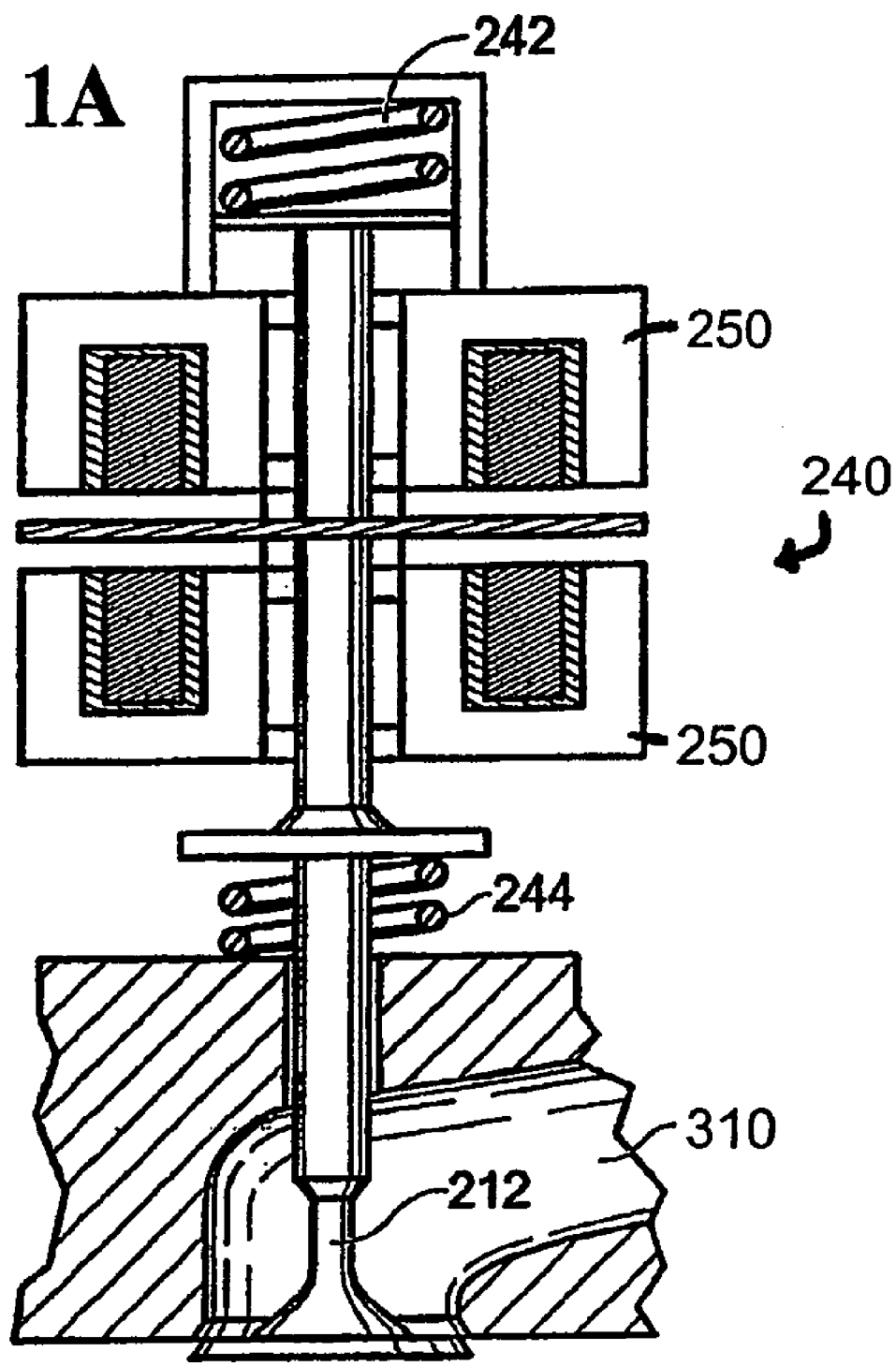
FIG. 1A is a schematic diagram of an engine valve.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve is operated by an electromechanically controlled valve coil and armature assembly 53, such as shown in FIG. 1A. Armature temperature is determined by temperature sensor 51. Valve position is determined by position sensor 50. In an alternative example, each of valves actuators for valves 52 and 54 has a position sensor and a temperature sensor. In still another alternative, one or more of intake valve 52 and/or exhaust valve 54 may be cam actuated, and be capable of mechanical deactivation. For example, lifters may include deactivation mechanism for push-rod type cam actuated valves. Alternatively, deactivators in an overhead cam may be used, such as by switching to a zero-lift cam profile.

Intake manifold 44 is also shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail. Alternatively, the engine may be configured such that the fuel is injected directly into the engine cylinder, which is known to those skilled in the art as direct injection. In addition, intake manifold 44 is shown communicating with optional electronic throttle 125.

Distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust manifold 48 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, and read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 119 coupled to an accelerator pedal; a measurement of engine manifold pressure (MAP) from pressure sensor 122 coupled to intake manifold 44; a measurement (ACT) of engine air amount temperature or manifold temperature from temperature sensor 117; and a engine position sensor from a Hall effect sensor 118 sensing crankshaft 40 position. In a preferred aspect of the present description, engine position sensor 118 produces a predetermined number of equally spaced pulses every revolution of the crankshaft from which engine speed (RPM) can be determined. The output of sensor 118 can be used to identify engine position.

In one example where cam actuated valves are used (along or in addition to electrically actuated valves), a camshaft sensor may also be used. In such cases, a combination of information from the camshaft sensor and crankshaft sensor can be used to identify engine position. For example, these sensors can be coupled with toothed wheels. In one particular embodiment, the crank shaft can have a decoder wheel with one or two missing teeth. The missing teeth may be used to decode top dead center position (TDC). The camshaft can also have a decoder that puts out one pulse per cam shaft revolution (720 crank angle degrees) to identify stroke.

In an alternative embodiment, a direct injection type engine can be used where injector 66 is positioned in combustion chamber 30, either in the cylinder head similar to spark plug 92, or on the side of the combustion chamber. Also, the engine may be coupled to an electric motor/battery system in a hybrid vehicle. The hybrid vehicle may have a parallel configuration, series configuration, or variation or combinations thereof.

FIG. 1A shows an example dual coil oscillating mass actuator 240 with an engine valve actuated by a pair of opposing electromagnets (solenoids) 250, 252, which are designed to overcome the force of a pair of opposing valve springs 242 and 244. FIG. 1A also shows port 310, which can be an intake or exhaust port. Applying a variable voltage to the electromagnet's coil induces current to flow, which controls the force produced by each electromagnet. Due to the design illustrated, each electromagnet that makes up an actuator can only produce force in one direction, independent of the polarity of the current in its coil. High performance control and efficient generation of the required variable voltage can therefore be achieved by using a switch-mode power electronic converter. Alternatively, electromagnets with permanent magnets may be used that can be attracted or repelled.

As illustrated above, the electromechanically actuated valves in the engine remain in the half open position when the actuators are de-energized. Therefore, prior to engine combustion operation, each valve goes through an initialization cycle. During the initialization period, the actuators are pulsed with current, in a prescribed manner, in order to establish the valves in the fully closed or fully open position. Following this initialization, the valves are sequentially actuated according to the desired valve timing (and firing order) by the pair of electromagnets, one for pulling the valve open (lower) and the other for pulling the valve closed (upper).

The magnetic properties of each electromagnet are such that only a single electromagnet (upper or lower) need be energized at any time. Since the upper electromagnets hold the valves closed for the majority of each engine cycle, they are operated for a much higher percentage of time than that of the lower electromagnets.

While FIG. 1A appears to show the valves to be permanently attached to the actuators, in practice there can be a gap to accommodate lash and valve thermal expansion.

As will be appreciated by one of ordinary skill in the art, the specific routines described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the disclosure, but is provided for ease of illustration and description. Although not explicitly illustrated, one of ordinary skill in the art will recognize that one or more of the illustrated steps or functions may be repeatedly performed depending on the particular strategy being used. Further, these Figures graphically represent code to be programmed into the computer readable storage medium in controller 12.

Figure 2:
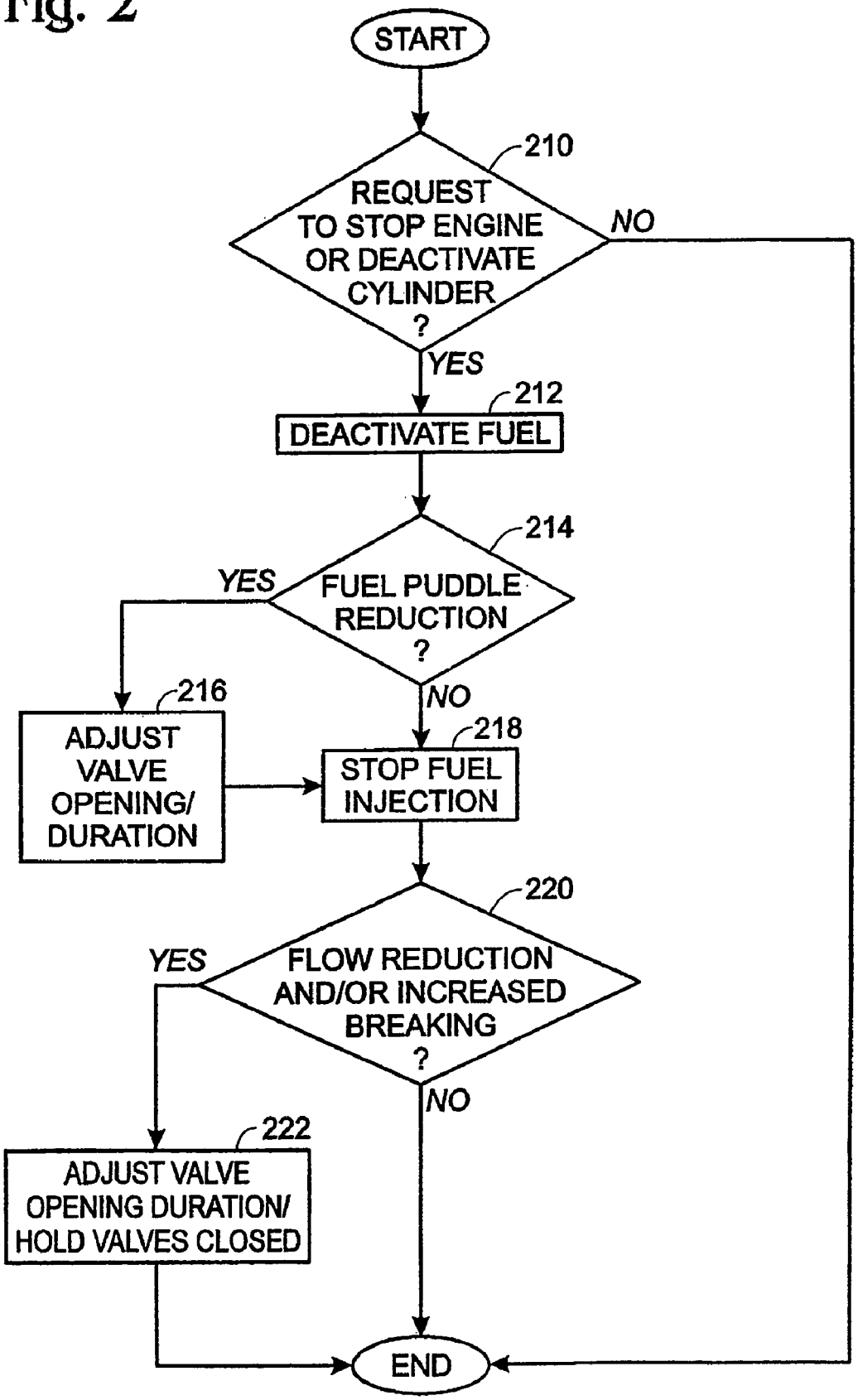
FIG. 2 is a flowchart of a method to control valve timing after a request to stop an engine or to deactivate a cylinder.

Referring now to FIG. 2, a routine is described for controlling an engine shut down. Various features may be used during the engine shut-down. The shut-down may be a vehicle shut-down (such as key-off), an engine shut-down such as during a pure electric mode of a hybrid powertrain, or a partial engine shut-down (e.g., one or more cylinder deactivated). These features may include adjusting valve opening/closing timing during the shut-down to draw a larger amount of a fuel puddle into the cylinder for combustion. They may also include adjusting valve opening/closing timing during the shut-down to increase engine braking to achieve a faster engine stopping time. Further, they may also include holding some valves (e.g., intake and/or exhaust) closed to reduce a flow of pumped gasses through the exhaust system during the shut-down. Further still, various combinations of these features may be used.

Referring now specifically to FIG. 2, in step 210 the routine determines if a request has been made to stop the engine or deactivate one or more cylinders. The request may be initiated by the driver of the vehicle or from within the vehicle control architecture, such as a hybrid-electric vehicle. If a request is present the routine proceeds to step 212. If no request is present the routine proceeds to exit.

In step 212, fuel is deactivated to individual cylinders based on the combustion order of the engine. That is, fuel injections that are in progress complete injection, and then fuel is deactivated. Then, in step 214 a determination is made as to whether fuel puddle reduction adjustments should be made. If so, in step 216, calculations that determine the cylinder port fuel puddle mass continue and the intake valve duration are adjusted to produce the desired air-fuel ratio. Fuel puddle mass is determined with the method in accordance with U.S. Pat. No. 5,746,183, which is hereby fully incorporated by reference. In addition, spark may be adjusted in this step based on the request to stop the engine. In one example, spark is adjusted to a value retarded from MBT (minimum advance for best torque) to reduce engine hydrocarbons and increase exhaust heat. For example, adjusting spark during shut-down, catalyst temperature may be increased so that if the engine is restarted sometime soon, higher catalyst conversion efficiency may be achieved, due to a higher catalyst temperature. In another example, retarding spark during engine shut-down may reduce evaporative emissions. Since hydrocarbon concentrations in exhaust gas may be reduced, exhaust gases that escape to the atmosphere during an engine stop may have fewer hydrocarbons.

Thus, in some examples, during an engine shut-down operation, computer readable code can be used to retard ignition timing on at least one of a group of final combustion events during the shut-down to increase exhaust temperature thereby improving emissions on a subsequent engine re-start. In one example, upon receiving a command to shut-down the engine, one or several combustion events are still carried out, e.g., 1, 2, 3, 4, or a range of combustion events depending on operating conditions, e.g., 1-5, 1-3, 1-2, etc. By adjusting the ignition timing of at least some of these (e.g., the last one, the last two, one of the last two or three), it is possible to improve later re-starts that are performed before the catalyst has cooled. Further, as noted above, adjusting of exhaust (or intake) valve opening and/or closing timing (or lift) can also be used (or alternatively used) to further increase exhaust gas heat to the catalyst during a shut-down.

In step 216, valve timing is adjusted. Thus, upon indication of a request to stop or cylinder deactivation, intake and exhaust valve timing may be adjusted. The intake valve opening (IVO) can be moved, for example, to the engine position where a high intake port velocity is obtained, typically 45 degrees after the intake stroke begins. Moving the valve opening position to this location draws more fuel into the cylinder from the intake port puddle for a last combustion event. This can reduce the fuel puddle when the cylinder is deactivated or when the engine is stopped. Furthermore, a smaller fuel puddle contributes less fuel to a cylinder when the engine is restarted, thereby leading to more accurate air-fuel control during a start.

The valves can be operated with adjusted timing for at least an intake event, but may be operated longer if desired. Furthermore, the intake valve opening can be adjusted to a location of between 30 and 180 crank angle degrees after top-dead-center of the intake stroke. The intake valve closing timing can also be adjusted to compensate air charge differences that may result from adjusting intake valve opening timing.

The cylinder air-fuel mixture during engine shut-down may be lean, rich, or stoichiometric depending on control objectives.

In addition, the exhaust valves and spark advance may also be adjusted during engine shut-down. For example, exhaust valves are adjusted to an opening location of between 0 and 120 crank angle degrees after top-dead-center of the exhaust stroke. When this exhaust valve timing is combined with a spark angle adjustment, additional heat can be added to the catalyst prior to engine shut-down. As mentioned above, this can increase catalyst temperature in anticipation of a subsequent start. Further the exhaust valve closing timing can also be adjusted based on the adjusted exhaust valve opening time. The routine then proceeds to step 218 where fuel injection is then sequentially stopped for each cylinder after the final combustion event.

Then, the routine proceeds to step 220 and determines whether flow reduction and/or increased engine braking is requested. If not, the routine ends. If so, the routine proceeds to step 222 where valve opening/closing timing and duration can be adjusted, and/or valves may be held closed. For example, intake valves may be held open and exhaust valves held closed (of one or more, or all cylinders) to reduce flow through the exhaust. In another example, valve timing/duration may be adjusted to generate expansion or compression braking. For example, any one or more of the approaches described in U.S. Ser. No. 10/888,715, filed Jul. 8, 2004, the entire contents of which is incorporated herein for all purposes, may be used. Examples of such operation are also described in more detail in the examples below. For example, valve timing can be adjusted where the exhaust valve is held closed and the intake valve is opened near TDC and closed near BDC and then opened again near TDC to generate compression braking. In another example, valve timing can be adjusted where the exhaust valve is held closed and the intake valve is opened near BDC and closed near TDC and then opened again near BDC to generate expansion braking.

Thus, the above example describes some example situations where, prior to stopping an internal combustion engine, intake valve timing can be adjusted in a manner that improves starting the next time the engine is operated while at the same time stopping the engine faster. For example, opening the intake valves later in an intake stroke of a cylinder can reduce residual fuel left in an intake port after an engine is stopped. As a result, residual fuel from previous engine operation becomes a smaller fraction of the fuel entering the cylinder during a subsequent start. Consequently, the necessary amount of fuel injected to start the engine increases and the fuel injected becomes a greater fraction of the total amount of fuel entering a cylinder during a start. Because the mass of the fuel injected is known to a greater certainty than an estimate of residual fuel, a more consistent and higher accuracy air-fuel ratio may result during a start.

The present disclosure may provide several advantages. For example, the method can improve engine air-fuel ratio control and reduce emissions during a start since less residual fuel is present in the intake manifold when the engine is restarted. This can be especially advantageous when a catalyst is cold and its efficiency is low. In addition, less fuel is available to evaporate from the intake manifold, which can reduce evaporative emissions.

Referring now to FIGS. 3-8, various examples of operation are described. The sequences shown in FIGS. 3-8 are not actual engine data but are shown for illustration purposes and the actual number of events during an engine shut-down may be more or less than those illustrated.

Figure 3:
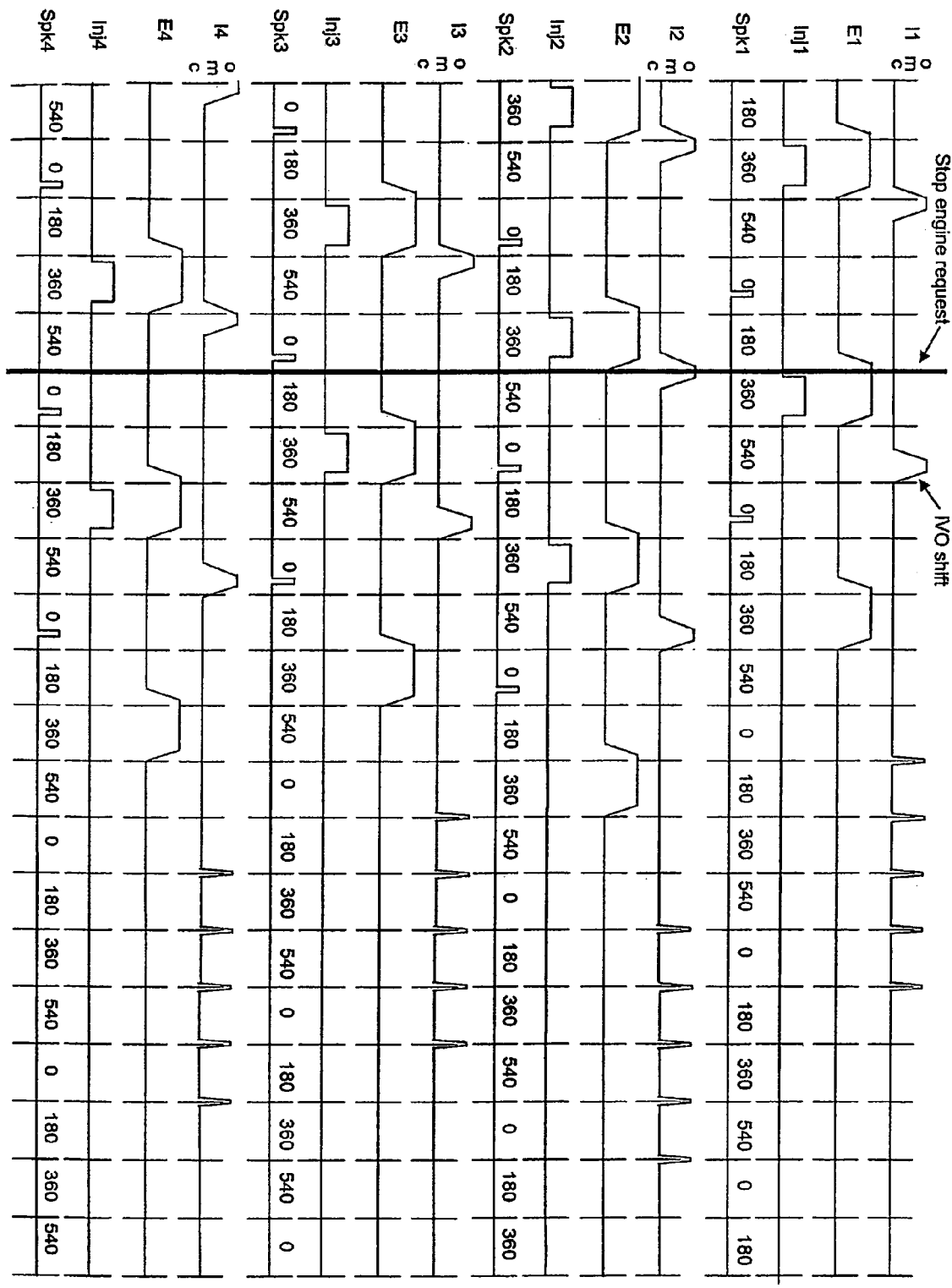
FIGS. 3-8 are plots of example valve timing during engine shutdown and/or cylinder deactivation.

FIG. 3 shows example intake and exhaust valve events, injection timing, and spark events for a four cylinder engine with adjustable intake and exhaust valve timing after a request to stop the engine is made. Each of the four piston positions is shown by angular degrees referenced to top-dead-center of the respective cylinder (i.e., 0 is top-dead-center of compression). A request to stop the engine is illustrated by the vertical line that divides engine events into two sections; pre-request and post-request. After a stop request has been made, intake valves are adjusted (denoted IVO shift) to a retarded position in an effort to reduce fuel that may be puddled in the intake manifold and/or cylinder head. After each cylinder inducts and combusts a final fuel amount, the exhaust valves open so that exhaust gases are expelled. Then, the exhaust valves are held in a closed position until engine speed is substantially zero (e.g., less than 100 RPM), when they are released to a neutral position. However, note that an additional combustion cycle in cylinder four may have been omitted because of the location of the stop request relative to the current cylinder stroke. That is, after a request to stop has been made, cylinders that have not been fueled may be deactivated, but this may cause the fuel puddle associated with that cylinder to remain in tact. After the exhaust valves are commanded to a closed position in a respective cylinder, the intake valves are opened near the top and bottom of subsequent piston strokes. By opening and closing the intake valves in this manner, compression and expansion work can be used to increase engine deceleration since little energy is recovered after expansion or compression. The illustrated sequence can reduce engine emissions because the amount of oxygen pumped to a catalyst during a stop is reduced. Also, the amount of exhaust gas trapped in a cylinder is reduced, which may improve engine restarts. Furthermore, the engine can stop quicker leading to fewer combustion events during a stop (i.e., fewer combustion events may lead to reduced fuel consumption and emissions). Moreover, by controlling expansion and compression work, the engine stop location may be better controlled. The number of intake compression/expansion relief valve events and the number of combustion events after IVO shift may be constant or may vary by engine operating conditions.

Alternatively, the exhaust valves may be held in a closed position after a final intake stoke in a respective cylinder.

Figure 4:
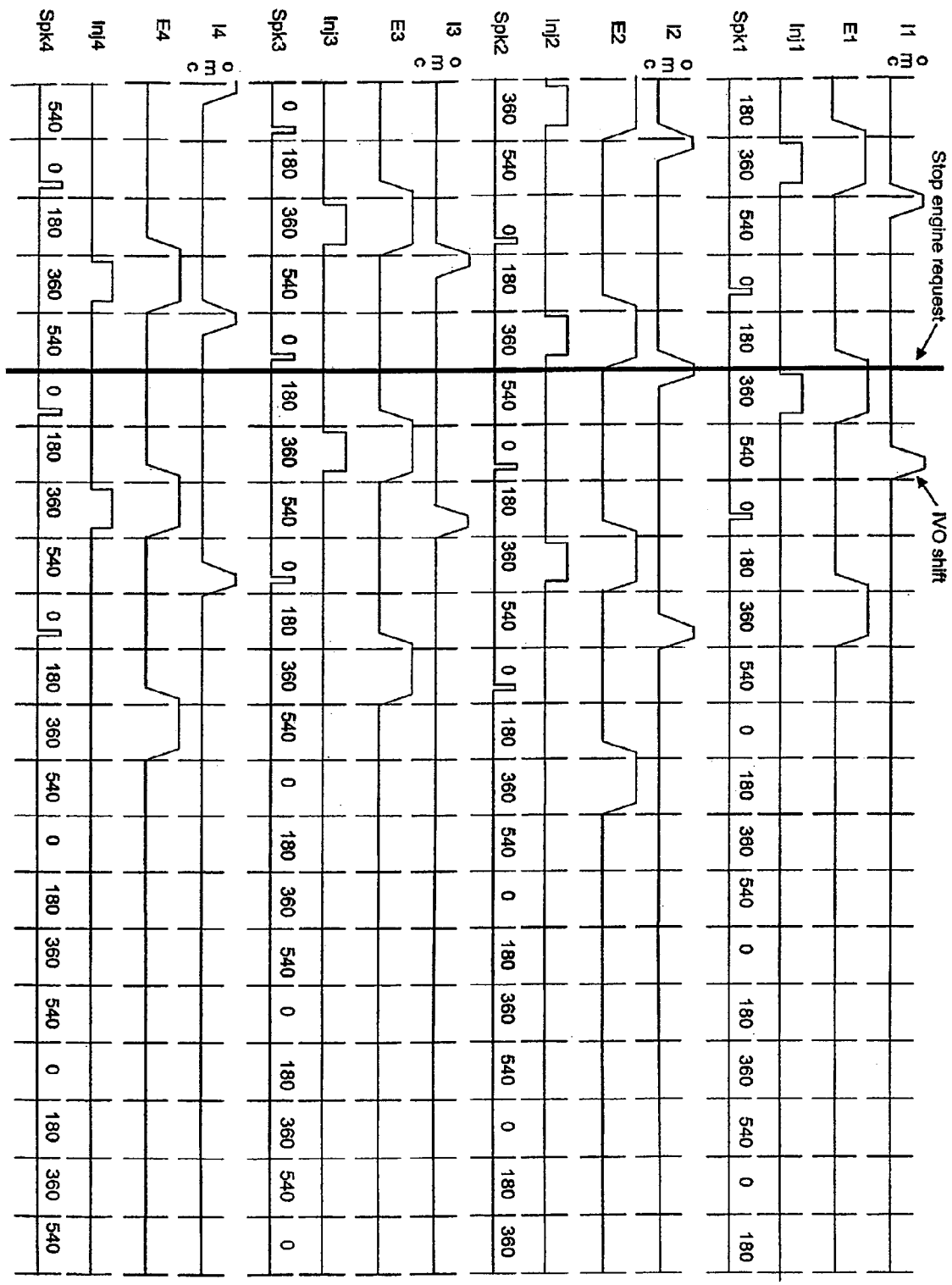

Referring now to FIG. 4, the sequence shown is similar to the sequence of FIG. 3, but the intake valves are held closed until the engine speed is substantially zero. By holding the intake valves closed, some compression and/or expansion work may be recovered so that the engine coastdown (i.e., time to reach zero speed from a request to stop) is increased. The benefits of the example of FIG. 4 are similar to those of the sequence of FIG. 3.

Alternatively, the exhaust valves may be held in a closed position (while intake valves operate or not) after a final intake stoke in a respective cylinder.

In yet another alternative, intake valves may be held closed while exhaust valves continue to operate after a final combustion event in the respective cylinder.

Figure 5:
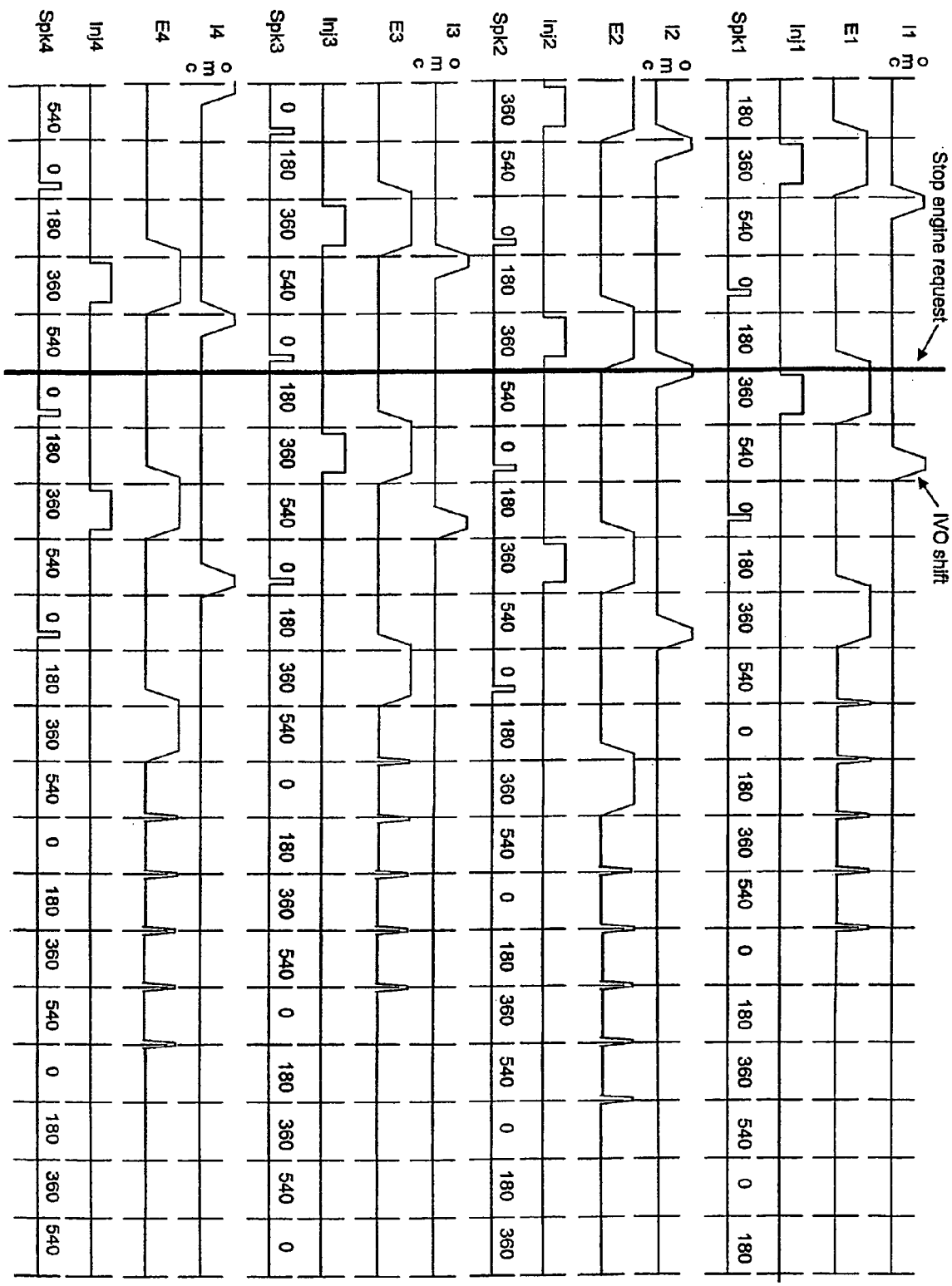

Referring now to FIG. 5, a sequence is shown that is similar to the sequence of FIG. 4, but the exhaust valves are opened and closed until engine speed is substantially zero to increase engine expansion and compression work. As mentioned in the description of FIG. 5, opening and closing the exhaust valves near top-dead-center and bottom-dead-center can reduce energy recovery of compression and expansion. The benefits of the FIG. 5 sequence are similar to those of the sequence of FIG. 3.

Figure 6:
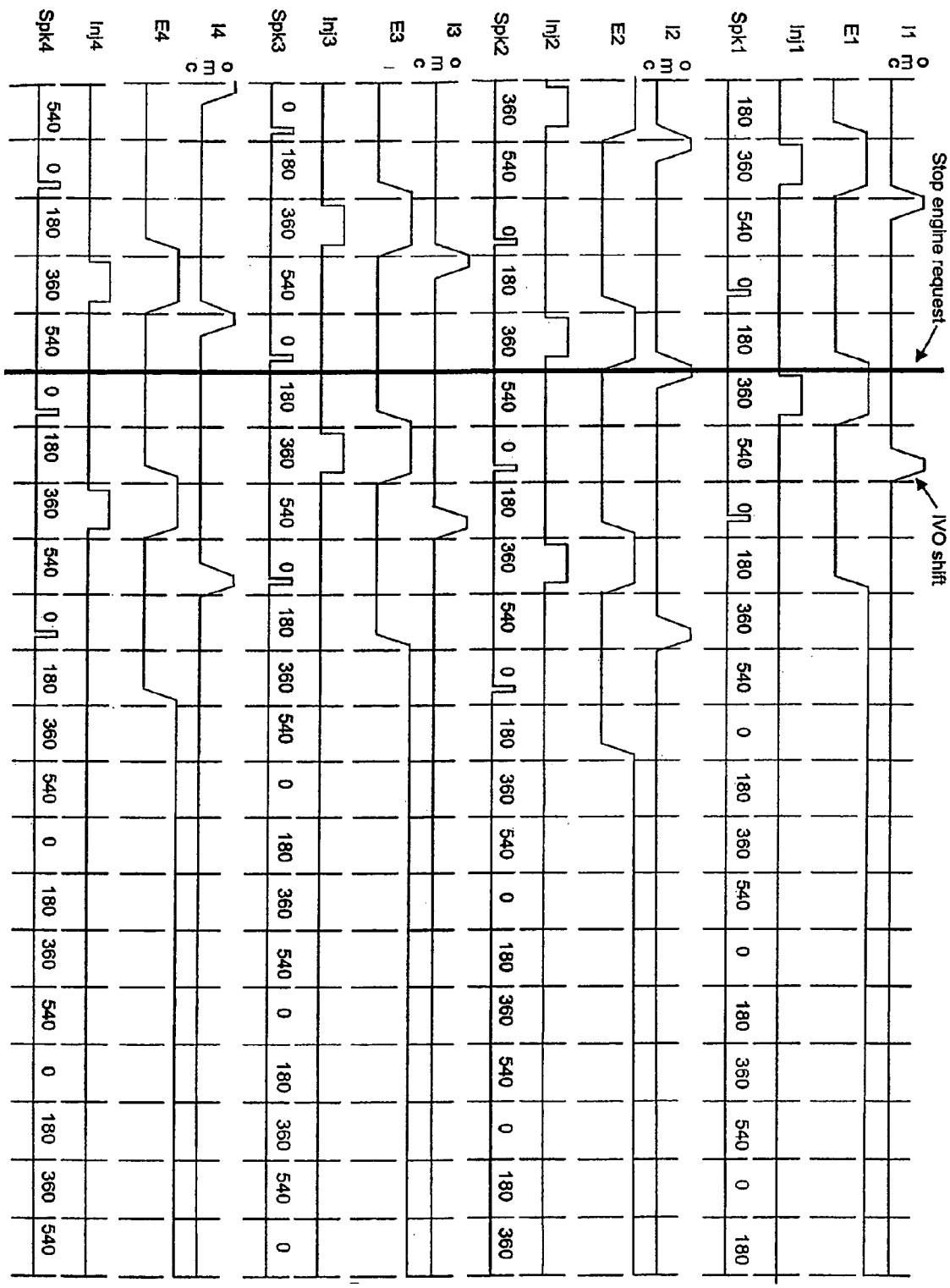

Referring now to FIG. 6, a valve sequence is shown that can reduce engine pumping work and catalyst oxidation during an engine shut-down. After an operator request to stop an engine, fuel and spark are customarily deactivated so that the individual cylinders do not continue to combust air-fuel mixtures. Even though spark and fuel have been deactivated, engine inertia can cause the engine to continue to rotate. If valve timing continues in the same manner as prior to the request to stop the engine (e.g., four stroke cycle), air may be pumped through the engine to a catalyst. An oxygenated catalyst (i.e., a catalyst with excess oxygen stored throughout or within a portion of a catalyst) may increase fuel consumption during a restart since additional fuel may be necessary to reset the state of the catalyst such that both oxidation and reduction may occur within the catalyst. By selectively operating intake and exhaust valves during shut-down and start-up catalyst, oxidation may be reduced along with emissions and fuel consumption. Furthermore, intake and/or exhaust valves may be kept closed on a hybrid vehicle where an IC engine may be started and stopped a number of times during a normal drive. By keeping intake and/or exhaust valves closed during a soak period, oxidation caused by convective exhaust cooling can be further decreased.

Continuing with FIG. 6, valve timing for a four-cylinder engine with valves that may be selectively activated during an engine shutdown is shown. After a request to stop the engine is made, IVO is shifted and a last combustion event occurs in each cylinder. As mentioned above, it is not necessary to have a final intake and combustion event for each cylinder if fuel puddling is of little or no concern. After a final combustion event in each of the respective cylinders, the exhaust valves are opened and remain open until engine speed is substantially zero, at which time the intake and exhaust valves are released to a neutral position. The intake valves remain closed after the final intake event until the engine speed is substantially zero. Allowing the exhaust valve to remain open during coast-down, while intake valves are closed, can reduce engine pumping work. The energy recovered by reducing engine pumping work may be captured by an electric motor or used to further propel a hybrid vehicle. By leaving intake valves closed and exhaust valves open, oxygen pumped through the engine during shut-down is reduced without increasing engine pumping work.

Alternatively, intake valves can be held open while exhaust valves are closed after the final combustion cycle is completed (i.e., after the exhaust valves close).

Figure 7:
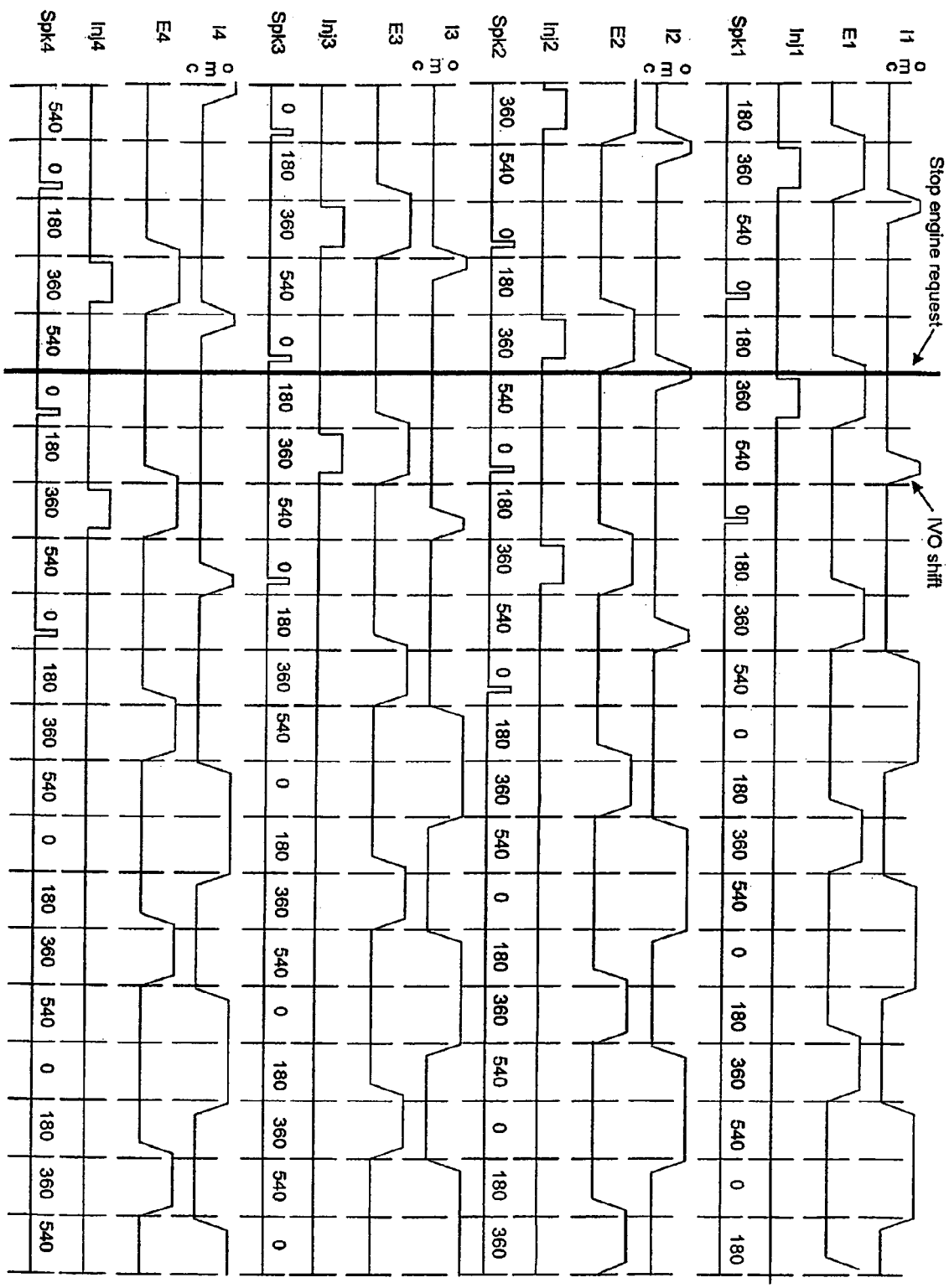

Referring now to FIG. 7, an alternate method to control intake and exhaust valves during an engine shut-down is shown. This method continues to operate both intake and exhaust valves after a request to stop the engine is made until engine speed is substantially zero, when the valves are released to a neutral position. After a final combustion cycle is completed in each respective cylinder, the intake valves are held open during a predetermined interval so that air flow through the engine is reduced. Namely, the intake valves are opened after the exhaust valves close (between −30 to +30 degrees after TDC exhaust stroke) and closed before the exhaust valves open (between −30 to +30 degrees after TDC compression stroke). The exhaust valve opens prior to the exhaust stroke and remains open until the end of the exhaust stroke. Of course, small variations in valve timing, different from those illustrated, may be used without deviating from the intent to reduce pumping work and air flow through the engine.

Alternatively, a partial number of cylinders may complete a fueled intake stroke after the request to stop the engine is made so that the shut-down sequence begins sooner.

Figure 8:
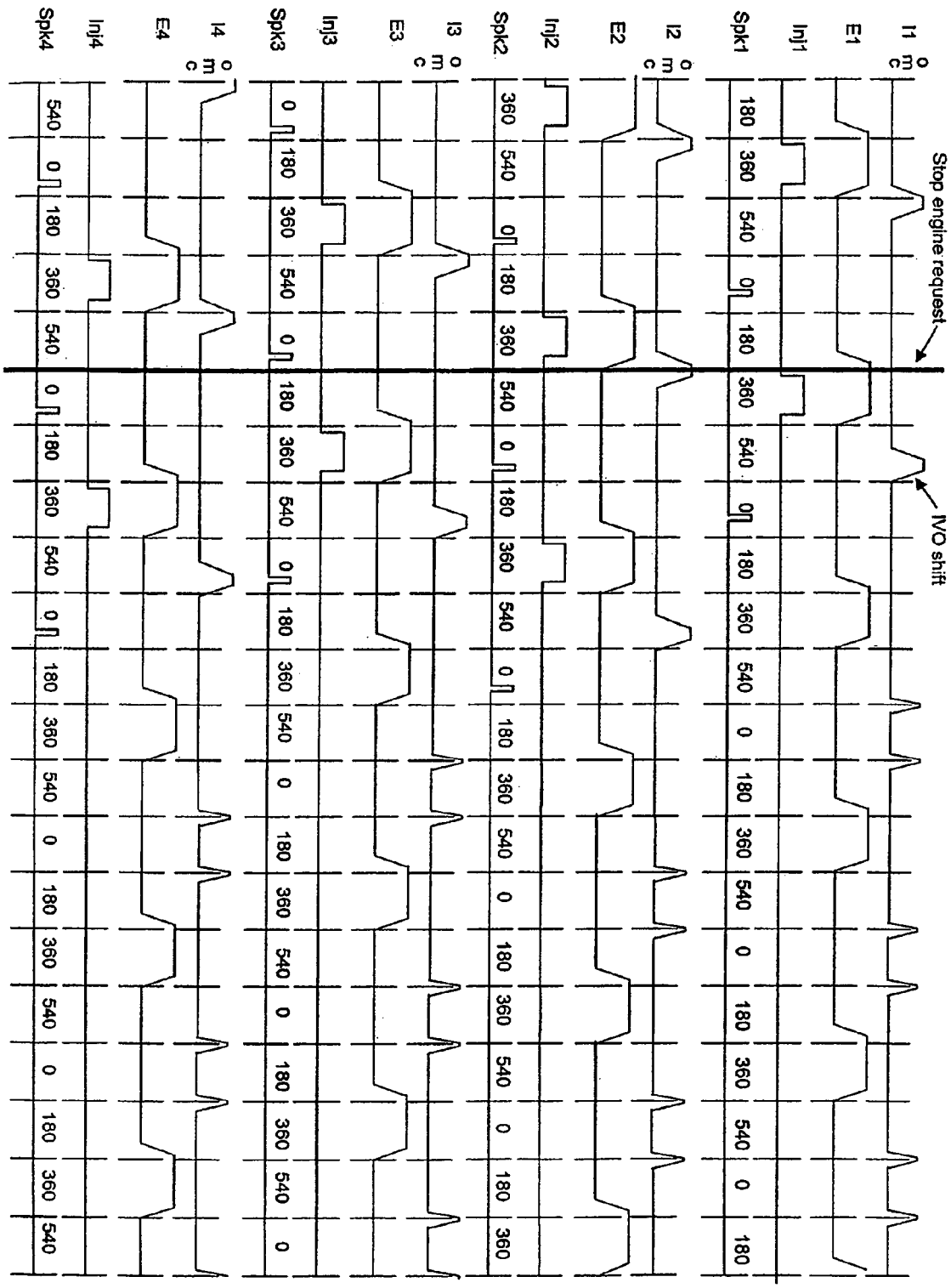

Referring now to FIG. 8, another alternate method to control intake and exhaust valves during an engine shut-down is shown. This method continues to operate both intake and exhaust valves after a request to stop the engine is made until engine speed is substantially zero, when the valves are released to a neutral position. After a final combustion cycle is completed in each respective cylinder, the intake valves are held closed except near (±30 degrees) BDC intake and TDC compression strokes where they are opened to release expansion or compression work. The exhaust valve opens prior to the exhaust stroke and remains open until the end of the exhaust stroke. Of course, small variations in valve timing, different from those illustrated, may be used without deviating from the intent to increase pumping work and decrease air flow through the engine. Further, the opening/closing times may be adjusted to vary the amount of braking torque generated. The sequence may be used to quickly stop engine rotation while reducing air flow through the engine. This may be beneficial to reduce engine emissions and to reduce perceived engine run-on.

A final combustion event in each cylinder of the engine is not necessary for any of the above sequences. Some cylinders may initiate a valve timing change immediately following the request to stop the engine.

The approach of FIGS. 7-8 may be especially advantageous for systems with electrically actuated intake valves and mechanically cam actuated exhaust valves, for example.

Note that the above approaches can be combined with engine starting approaches that further reduce flow through the exhaust system. For example, one or more intake and/or exhaust valves can be held closed for one or more cycles during engine starting and/or cranking. For example, exhaust valves may be held closed until a fist combustion event in the cylinder.

Another embodiment of example routines is shown in FIGS. 9-13, where engine stopping location may be advantageously controlled to a desired stopping position via adjustment of valve timing and/or lift of at least one cylinder, for example. A repeatable (or controlled) stopping location can then be used to improve subsequent re-starts in various ways, such as improved starting. For example, when the engine is first cranked by the starter, the position of the engine may not be known for up to a full engine cycle, in some cases. This may be due to inoperability (or degraded operation) of the crank position sensor below a given engine speed (that may depend on ambient factors, such as temperature, etc.). In one example, the speed may be around 100 rpm. Likewise, once the engine slows below this speed, the sensor may not provide reliable feedback information on position and/or speed. However, if the stopping position can be reliably and accurately controlled (at least under some conditions), it may be used to quickly fuel and start the engine.

In one embodiment, as the engine speed slows down to a calibratable value (at which the engine can generate sufficient braking torque to stop the engine in a specified amount of rotation, for example, about 100 rpm), the electrically actuated valve system can hold the exhaust valves closed and/or the intake valves closed during the final amount of rotation, which may be a single cycle. This will generate braking torque to stop the engine from rotating (via expansion and/or compression engine braking). The amount of expansion and/or compression braking can be adjusted by varying the timing of opening/closing of the valves and thus and can be calibrated to stop the engine at a predetermined position.

Various methods to perform such operation are described below, which may be used alone or in combination.

In one approach, the engine operates with electrically actuated intake valves and cam actuated exhaust valves. In this approach, during the final rotation, the intake valves on one cylinder are held shut. Specifically, for a four-cylinder engine, when the engine has two cylinders at TDC and two at BDC, the engine's rotational torque will be substantially balanced. One cylinder will be at BDC and have an open exhaust, and one cylinder will have both valves closed and be at BDC on the compression stroke requiring energy to compress the cylinder air. Another cylinder will be at TDC with both valves closed and contain compressed air releasing energy. The fourth cylinder will be at TDC and would normally have the intake valve(s) open. With this method, the intake valve(s) will be closed at a given angle after TDC. This will cause an increase in the rotational torque and stop the engine at a desired position before BDC for that cylinder. Thus, a known engine position can then be used for subsequent re-starts. Further, the cylinder selected for such operation can be one that is a selected distance from a known position on the crankshaft. For example, it can be selected to be about 180 crank angle degrees before a missing tooth on the crankshaft. In this way, on subsequent starts, the engine should just be reaching the minimum speed for reliable sensor operation (i.e., enough acceleration) several teeth before the missing tooth is encountered. This will enable the controller to quickly determine the engine position at the first missing tooth in a more repeatable manner.

Note that the angle after TDC for intake valve closing may be adjusted to provide a variable amount of compression braking torque, if desired. It may be adjusted based on the engine speed at TDC, and/or various other factors, such as coolant temperature, engine deceleration rate, and/or others.

In another approach, the engine operates with electrically actuated exhaust valves and cam actuated intake valves. This approach is similar to the approach described directly above, except that the cylinder at BDC with the exhaust valve open can be used to increase the rotational torque. As the cylinder that is starting the exhaust stroke passes BDC by a predetermined angle, the exhaust valve can be closed. This will cause an increase in the rotational torque used to stop the engine.

In yet another approach, the engine operates with both electrically actuated intake valve and electrically actuated exhaust valves. This approach can combine both of the approaches immediately above, using both the intake stroke cylinder and the exhaust stroke cylinder to produce the increase in rotational torque.

In still another embodiment, the controller may select form the various approaches above depending on operation conditions. For example, if higher stopping torque is required (e.g. the engine is at a higher RPM in the selected location, or decelerating at a slower rate), then a higher stopping torque may be produced by using two cylinders to generate braking torque. Alternatively, if lower stopping torque is required (e.g. the engine is at a lower RPM in the selected location, or decelerating at a higher rate), then a lower stopping torque may be produced by using less cylinders to generate braking torque. Further, the braking torque may be varied by varying the timing of the valve closing, and also varied by using expansion braking, or combinations of expansion braking and compression braking.

While some of the above methods have utilized electrically actuated valves, mechanically adjustable valves with variable timing and/or lift may also be used.

Note also that upon identifying that engine stopping control will be used, a final fuel injection may be provided to prepare one or more cylinders for future re-starting, even when using a port fuel injected engine.

Figure 9:
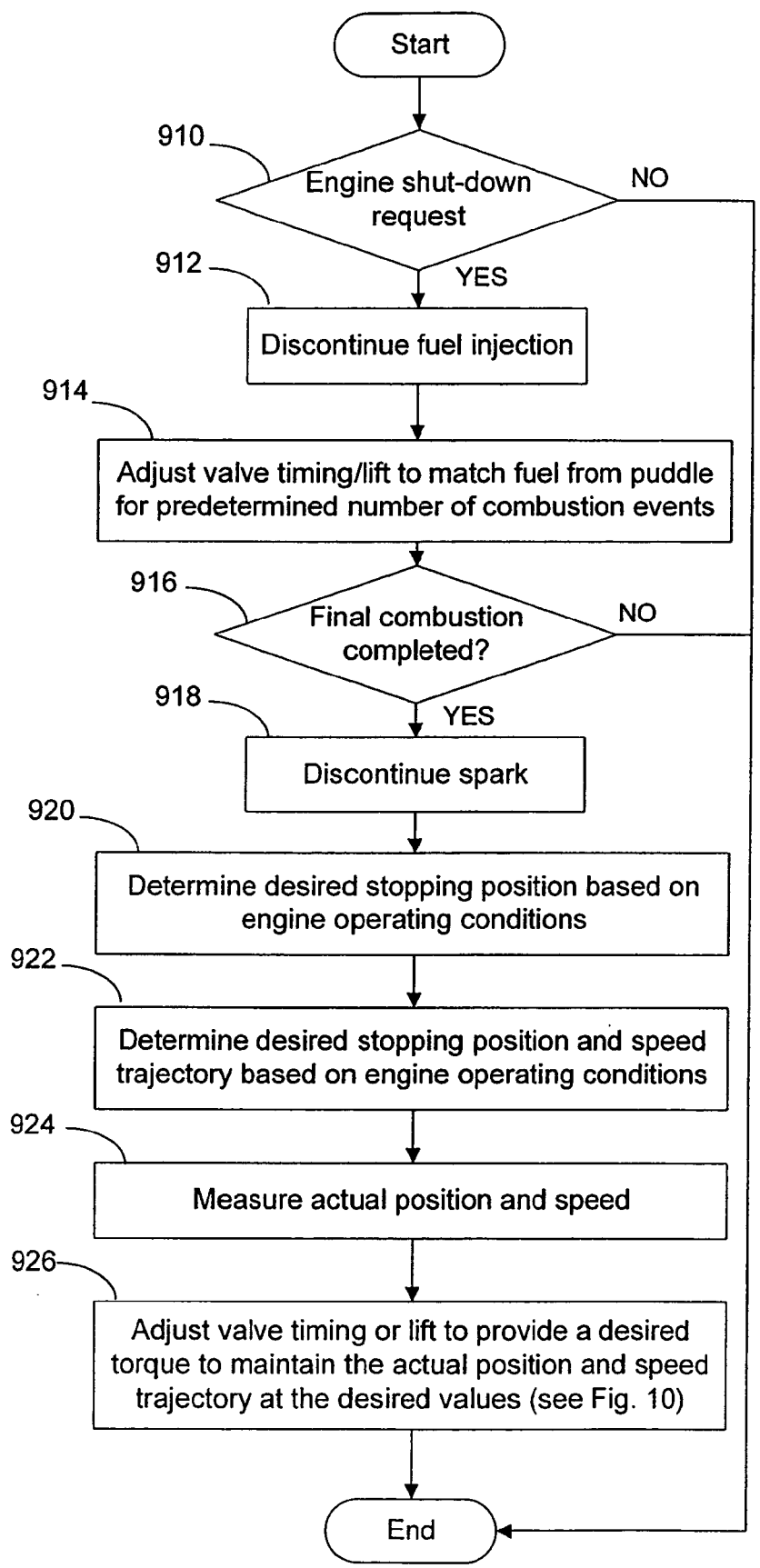
FIGS. 9-12 are routines and diagrams of example operation.

Referring now specifically to FIG. 9, a routine is described for controlling engine stop position via valve adjustments. First, in step 910, the routine determines whether an engine shut-down request has been identified. If so, the routine continues to step 912 to discontinue fuel injection. This can be performed simultaneously for all cylinders, or in a selected order based on firing order, to provide that some of the fuel puddle is used (as described above herein). Then, in step 914, the valve timing and/or lift is adjusted to match the fuel in the cylinder (from injected fuel and/or from the puddle) for a predetermined number of cylinder events. In step 916, the routine then determines if a final combustion has been completed. If so, the routine continues to step 918, where spark is discontinued.

Then, in step 920, the routine continues to determine a desired stopping position based on engine operating conditions, assuming that engine stop control is active. For example, the routine may select a desired stopping position based on coolant temperature, ambient temperature, ambient pressure, or various other parameters. In this way, improved restarting can be obtained as the engine starting position will be in a range that gives improved performance for the ambient conditions of the vehicle.

Next, in step 922, the routine determines a desired position and speed trajectory to reach the desired stopping position. This determination can take into account various factors, such as coolant temperature, engine speed, gear position, etc. Further, the desired trajectory can be based on the available modes for generating braking torque, that can be influenced by the number of cylinders of the engine, and various other parameters.

Figure 10:
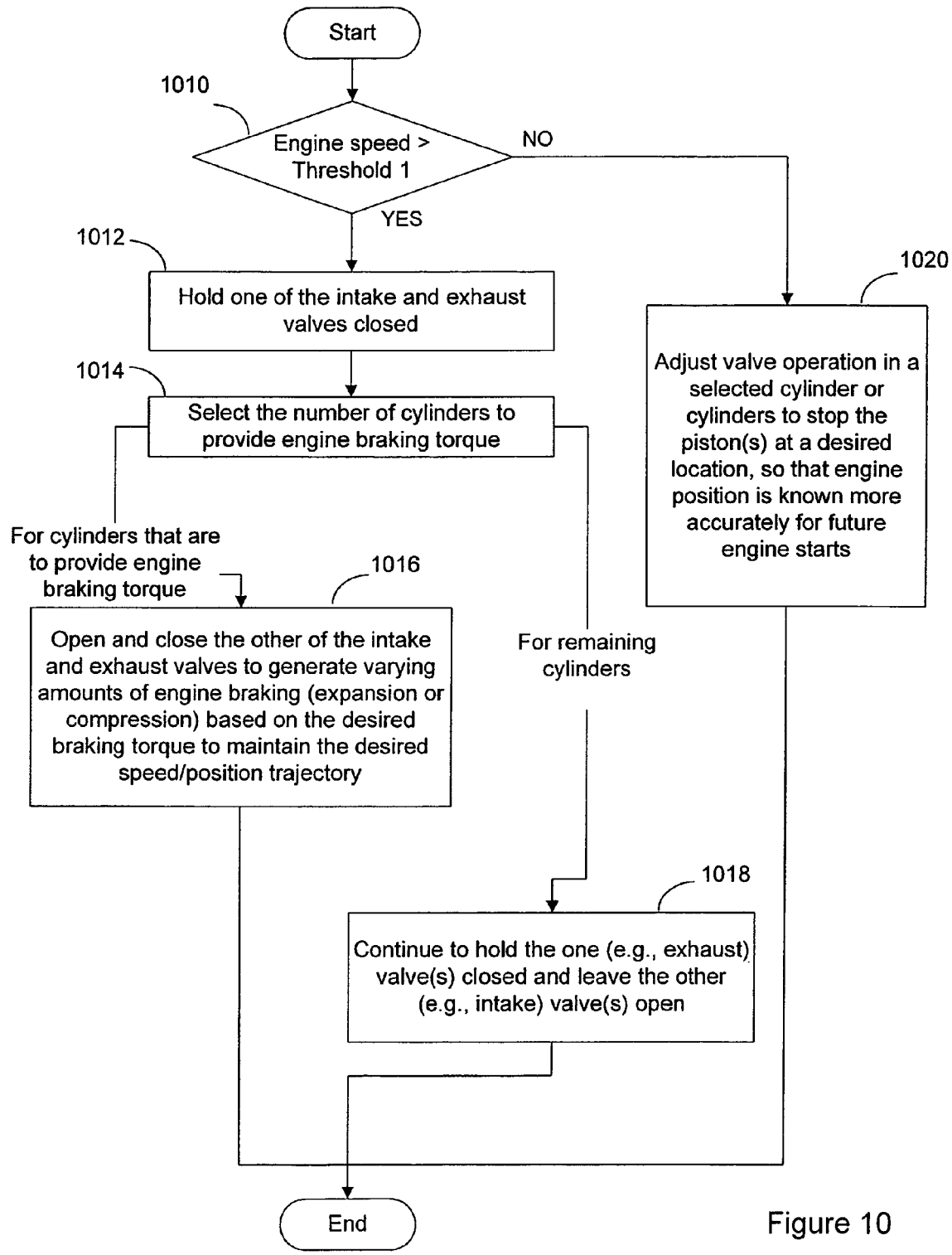

Then, in step 924, the routine measures the actual position and speed of the engine, and in step 926 adjusts valve timing and/or lift to provide a desired torque that will maintain the actual position and speed trajectory about their desired values, as shown in FIG. 10 in more detail.

Referring now to FIG. 10, a routine is described showing example details for controlling the engine to a desired stopping position, or stopping range. The routine selects both a number of cylinders and mode of providing a desired braking torque during an engine shut-down operation. First, in step 1010, the routine determines whether the engine speed is above a first threshold (Threshold 1). This threshold may be set approximately to the value below which the sensor degraded information may be received (for example, 100 RPM). Alternatively, this value may be set at the speed at which it is possible to stop the engine in a single cycle.

If so, the routine continues to steps 1012-1018 to rapidly reduce engine speed via engine braking operation in one or more cylinders. Alternatively, the routine continues to step 1020 to stop the engine at a selected position within a given number of cycles (e.g., a single cycle) by adjusting valve timing to generate expansion or compression braking torque. Specifically, the routine adjusts valve operation in a selected cylinder (or cylinders) as described in the various approaches above so that the engine position stops in a desired range. Then, this operation is used to improve later restarts as described herein.

Returning to step 1012, the routine first holds one of the intake and exhaust valves closed, and optionally leaves the other of the valves open to reduce pumping of oxygen through the exhaust. Then, in step 1014, the routine selects the number of cylinders to provide braking torque, based on the error between the desired speed deceleration trajectory and the actual trajectory (see FIG. 12, for example). For example, the number of cylinder providing torque can be varied to vary the level of braking torque, and also the valve timing of the braking cylinders can be varied to further refine the braking torque provided, as described herein.

Next, for the cylinders that are to provide engine braking torque, the routine continues to step 1016 to open and close the other of the intake and exhaust valves to generate varying amounts of engine braking (expansion or compression) based on the desired braking torque to maintain the desired speed/position trajectory. Alternatively, for the remaining cylinders, the routine continues to step 1018 to hold the one valve closed and leave other valve(s) open. In this way, these remaining cylinders reduce flow pumped through the exhaust.

Figure 11:
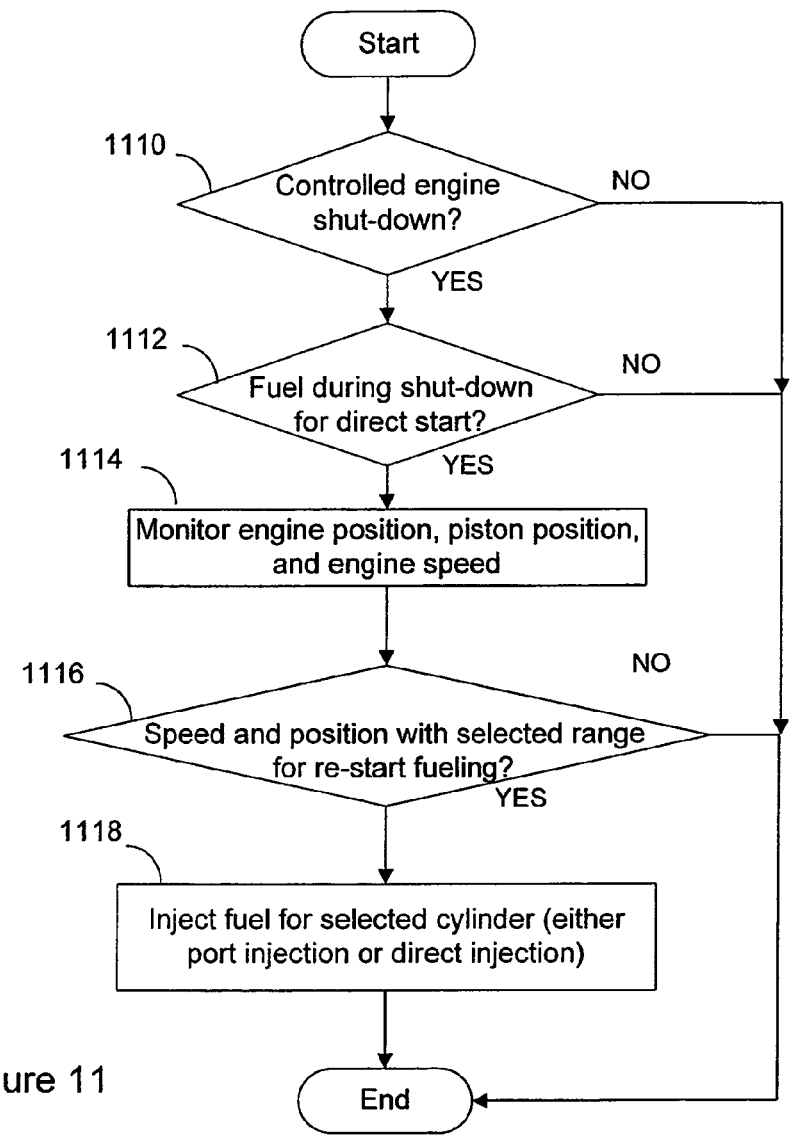

Referring now to FIG. 11, a routine is described that may be used with the above embodiments to improve restarting by injecting fuel during the engine shut-down so that it may be used to enable faster subsequent re-starts. Specifically, in step 1110, the routine determines whether a controlled engine shut-down is being performed. As noted above, a controlled engine stopping position may be used to advantage during some conditions, but during other conditions may not be used. If so, the routine continues to step 1112 to determine whether fueling during the shut-down (for subsequent restarts, such as direct starts [where engine rotation is generated from rest via combustion in selected cylinders in the appropriate position to rotation the engine the appropriate direction]) will be used. This selection can be based on various factors, such as ambient temperature, ambient pressure, engine conditions, vehicle conditions, and/or combinations thereof. For example, during extreme hot and/or cold conditions, fueling for re-starts during a shutdown may not be used (for example where the position control may degrade, or where direct re-starting may be more challenging), whereas during other conditions such fuel may be used.

If the answer to step 1112 is Yes, the routine continues to step 1114 to monitor engine position, piston position, and engine speed. Then, in step 1116, the routine determines whether the engine speed and/or position is within a selected range for re-start fueling. If so, the fuel injector is operated to inject fuel for the appropriate cylinder in step 1118. The amount of fuel may be adjusted based on the expected stopping position (which defines the amount of fresh air available for combustion in the case of direct starting), ambient temperature, ambient pressure, and/or various other factors. Note also that if PFI (port fuel injected) operation is used, the fuel should be injected before the engine stops rotation. However, if DI (direct injection) operation is used, the fuel may be injected during the stop and/or subsequent to the re-start.

Figure 12:
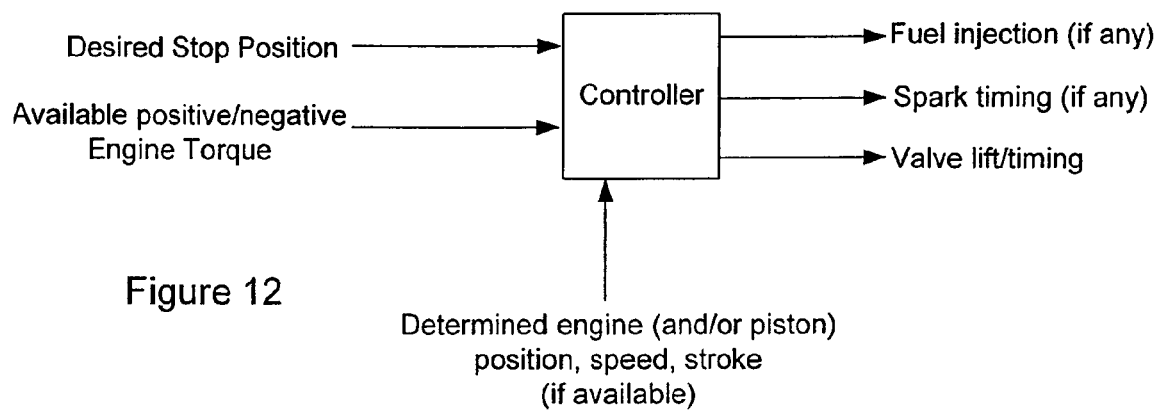

Referring now to FIG. 12, a control architecture is illustrated showing the engine position control during shut-down in block diagram form.

It will be appreciated that the configurations and routines disclosed herein are exemplary in nature, and that these specific embodiments are not to be considered in a limiting sense, because numerous variations are possible. For example, the above approaches can be applied to V-6, I-4, I-6, V-12, opposed 4, and other engine types. Also, the approaches described above are not specifically limited to a dual coil valve actuator. Rather, it could be applied to other forms of actuators, including ones that have only a single coil per valve actuator, and/or other variable valve timing systems, such as, for example, cam phasing, cam profile switching, variable rocker ratio, etc.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method for operating at least one of an intake valve and an exhaust valve of an engine, the engine including a plurality of cylinders, each of the plurality of cylinders including a piston, the method comprising:

during conditions of an engine shut-down, monitoring engine rotation; and when engine speed falls below a threshold value, repeatably stopping the engine with a selected piston in a selected stopped location by adjusting at least one of an intake or exhaust valve opening or closing, wherein said selected piston varies with operating conditions from one engine shut-down to another engine shut-down.

2. The method of claim 1 wherein said selected location varies with operating conditions.

3. The method of claim 1 wherein said one valve is an electrically actuated valve.

4. The method of claim 1 wherein said one valve is an electrically actuated intake valve.

5. The method of claim 1 wherein said one valve is opened and closed to generate one of engine expansion or compression braking torque.

6. The method of claim 5 wherein other cylinders are operated with a valve held open throughout cycles of the cylinder.

7. The method of claim 1 further comprising restarting the engine from said stopped piston location.

8. The method of claim 1, further comprising injecting fuel into the cylinder of the selected piston during an engine shut-down without combusting said fuel for use in a subsequent re-start of the engine.

9. The method of claim 1, wherein the selected stopped location is within a selected range.

10. A method for operating an engine in a vehicle, the engine having at least a first and second cylinder, said cylinders having at least an intake and exhaust valve, comprising:
during conditions of an engine shut-down, monitoring engine operation;
when engine operation enters a specified region, repeatably stopping the engine in a selected stopped location by adjusting valve opening or closing operation of one of said intake and exhaust valves so that both said first and second cylinder generate one of expansion or compression braking torque; and
wherein other cylinder are operated with a valve held open or closed throughout cycles of the cylinder.

11. The method of claim 10 wherein other cylinders are operated with a valve held open throughout cycles of the cylinder.

12. The method of claim 10 wherein other cylinders are operated with valves held closed throughout cycles of the cylinder.

13. The method of claim 10 wherein said valves are adjusted to repeatably stop the engine with a selected piston in a selected location.

14. The method of claim 10 wherein an amount of valve adjustment varies with changes in ambient conditions of the vehicle.

15. The method of claim 10 wherein an amount of valve adjustment varies with changes in engine speed.

16. The method of claim 10 wherein an amount of valve adjustment varies with changes in engine position.

17. A method for operating an engine in a vehicle, the engine having at least a cylinder, the method comprising:
decreasing rotational speed of the engine; and
when said engine speed falls in a specified region, stopping rotation of the engine in a desired range by adjusting at least an exhaust valve timing of the cylinder to generate one of expansion or compression braking torque.

18. The method of claim 17 wherein said range is a desired stopping position.

19. The method of claim 17 wherein an intake valve closing timing is further adjusted to generate one of expansion or compression braking torque.

20. The method of claim 17 wherein said exhaust valve is electrically actuated, and only during selected conditions, fuel is injected during an engine shut-down for use in subsequent re-starts.

21. A method for operating an engine in a vehicle, the engine having at least a cylinder, the method comprising:
during engine conditions above a first engine speed, adjusting valve operation in one or more cylinders to generate engine braking torque to reduce engine speed; and
during engine condition below a second engine speed, stopping the engine in a desired location by holding an intake valve or an exhaust valve closed throughout rotation of at least a substantial portion of a cycle of the engine.

* * * * *